Figure 1:
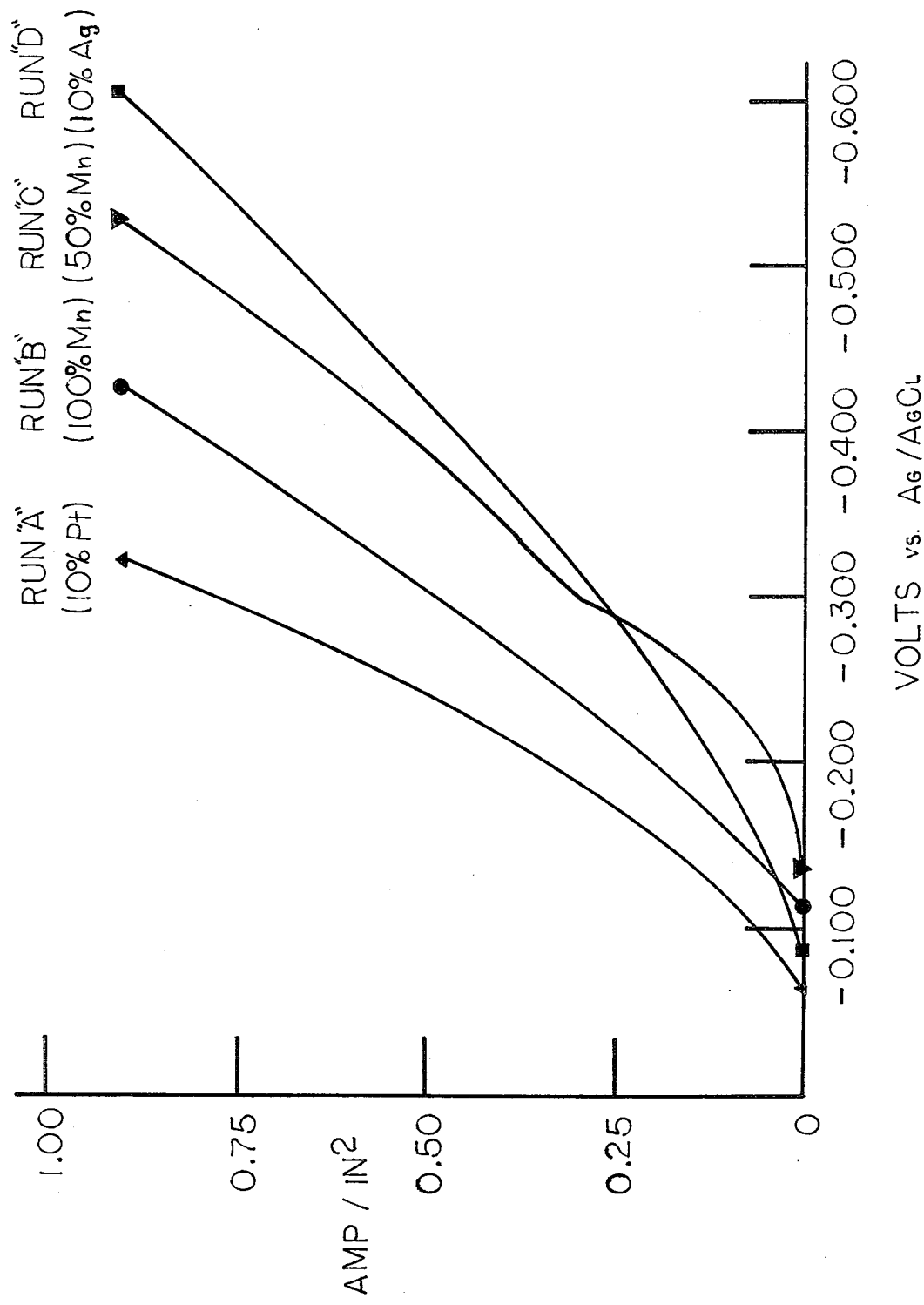

United States Patent [19]

Deborski

[11] 4,197,367

[45] Apr. 8, 1980

[54] POROUS MANGANESE ELECTRODE(S)

[75] Inventor: Gary A. Deborski, Midland, Mich.

[73] Assignee: The Dow Chemical Company, Midland, Mich.

[21] Appl. No.: 939,603

[22] Filed: Sep. 5, 1978

[51] Int. Cl.$^2$ ............... H01M 8/00; H01M 4/86; C25B 11/06

[52] U.S. Cl. .................. 429/223; 204/284; 204/292; 252/471; 429/224

[58] Field of Search ............ 204/292, 284, 45.5; 252/471; 76/245; 428/566; 429/224, 223

[56] References Cited

U.S. PATENT DOCUMENTS

| | | | |
|---|---|---|---|
| 2,593,943 | 4/1952 | Wainer | 75/245 X |
| 2,642,654 | 6/1953 | Ahrens | 428/566 |
| 2,717,870 | 9/1955 | Dean | 204/45.5 |
| 3,378,365 | 4/1968 | Bruns et al. | 428/566 X |
| 3,379,570 | 4/1968 | Berger et al. | 429/129 |
| 3,431,220 | 3/1969 | Batzold | 252/472 |
| 3,753,782 | 8/1973 | Beccu et al. | 429/221 |
| 4,109,060 | 8/1978 | Andersson et al. | 425/566 |

*Primary Examiner*—F. Edmundson
*Attorney, Agent, or Firm*—James H. Dickerson, Jr.

[57] ABSTRACT

A catalytically-active electrode, especially well suited for the electroreduction of oxygen in alkaline media, is comprised at least partially of a substantial proportion of finely comminutated, particulate metallic manganese fabricated in a porous body form of structure so as to retain its essential elemental integrity or character.

7 Claims, 2 Drawing Figures

POROUS MANGANESE ELECTRODE(S)

BACKGROUND OF THE INVENTION

Gas electrodes, in and with which a gas is passed in contact with a suitable electrode conductor in the presence of an electrolyte solution, are well known. Many modern gas electrodes are made to be porous and to have catalytically-active surface areas, including the walls of the interstitial passageways within the electrode body. In this way, there can be realized maximization of the available and effective surface area for given unit geometric volumes of the electrode configuration.

Such general type and style of electrode construction is especially advantageous for the oxygen gas-bearing, depolarized electrodes, particularly cathodes, that are well adapted for the electroreduction of oxygen in alkaline media.

The usage technique applied with such electrodes often involves passage of the oxygen-bearing gas through the porous electrode body for contact with the involved electrolyte interstitially therewithin and/or at and on the electrolyte-contacting face or wall of the electrode body. The indicated practice is desirable for electrolyzing functions and, conversely, as well as for operation in the galvanic mode as in fuel cells. Oxygen gas-bearing depolarized cathodes so made and operated are particularly attractive for utilization in chlor-alkali and the like or equivalent manufacturing cell operations.

A great and impelling reason (although other benefits also accrue) for employing oxygen gas-bearing, depolarized porous electrodes to electrolyze common salt brine into chlorine and caustic, and for analogous production purposes, is economic. Potentially significant savings in power requirements for given electrolysis workings are anticipatable due to substantial reductions potentially achievable in needs for applied electrical consumption when such electrodes are utilized. This is evident in comparison of voltage levels for the involved electrochemical reactions, taking into account that conventional cells already are usually operated at quite low voltages; the cathodic reactions (disregarding overvoltage effects) respectively being:

In traditionally common chlor-alkali cells

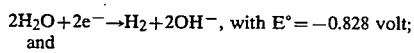

and

With the oxygen-gas depolarized cathodes

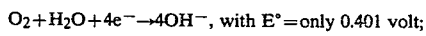

there being a consequent theoretically attainable saving of 1.229 volts in the difference.

Literally from their inception and classically, oxygen electrodes have been catalyzed by various precious and semi-precious metals and compounds thereof, such as gold, osmium, palladium, platinum, silver and so forth and their alloys, oxides and other compositions. These noble metals are not only in generally scarce supply for other than jewelry adornments and ornamentations and/or monetary purposes, but are inherently extremely expensive for industrial applications. Because of this, their consumption for electrode preparation is carefully controlled and extended to the greatest possible extent; this usually being done so as to minimize total quantity usage by deposition thereof in the form of platings or other applied layers or coatings over a suitable substrate, such as porous nickel plaque.

It would obviously be desirable to have a more abundant and readily-available, less costly, catalytically-active material adaptable to electrode construction, especially for satisfactory use in alkaline media as an oxygen gas-bearing depolarized cathode for electrolysis or galvanic mode purposes. Manganese is one such substance; being in good, relatively-inexpensive supply so as to permit more copious use thereof in and for electrodes. This, at least superficially and apparently, would seem to have ensured the provision of reliable and effective electrodes based on manganese made in straightforward and uncomplicated fashion.

Surprisingly, however, the stated expectation is not the case. The heretofore known electrodes utilizing some form of manganese either employ the oxides, carbides or other compounds of the metal as coatings or fillers for the electrode or resort to treatment of the metal merely as a substrate carrier for another physically-blended, catalytically-active, amalgamated sort of additament or necessitate using a metallurgical alloy of the metal for electrode fabrication. U.S. Pat. Nos. 3,088,851; 3,496,021; 3,607,787; 3,616,323; 3,753,782; and 3,778,307 as well as *Chemical Abstracts,* 78:79013y are exemplary of one or another form of these practices which, by one or another means of complication, employ and teach use of only either reacted or alloyed manganese for electrodes.

FIELD AND OBJECTIVES OF THE INVENTION

The present invention lies generally in the field of electrochemistry, being more particularly relevant to an improved, catalytically-active, porous electrode construction that is very nicely adaptable to the electroreduction of oxygen in alkaline media, which electrode is made substantially if not completely of relatively plentiful and modest in cost finely comminutated, particulate, elemental metallic manganese and which is neither expensive nor complicated to fabricate and gives good and reliable results in operation; the furnishment of same for various electrochemical applications being among the principal aims and objectives of the invention.

SUMMARY OF THE INVENTION

The present invention is directed to an electrode body for the herein delineated electrochemical purposes that, in basic substance and essence, is formed of: a shaped mass of coherent, integrated metal powder comprised, at least in part, of a substantial proportion of said mass of finely communitated, particulate, metallic manganese, said mass being bonded together by consolidation of the individual metal particles therein to an apparent density that is less than the theoretically attainable density of the involved metal in the mass so as to leave internal pores and interstitial passageway voids in said body. In many cases, compacting and/or sintering procedures may advantageously be followed in order to achieve in the shaped mass that is formed either a pressurized consolidation thereof alone or with added sintering effects and results therein. The working proportional details and other significant specifics of the invention are also ingenuously set forth in the ensuing Specification and description.

PARTICULARIZED DESCRIPTION OF THE INVENTION

Porous electrodes or, more definitively, electrode bodies pursuant to the instant invention are comprised at least partially of metallic manganese coherently fabricated to desired integral geometric composite mass configuration or shape from a finely communitated and particulate or powder form of the metallic element. The resultant electrode, consequently and advantageously, is wholly and completely electrochemically catalytic when operated, this being especially beneficial during employment in alkaline media as an oxygen depolarized electrode.

In this connection, the "body" of the electrode for present purposes is descriptively considered to be the essential, electrochemically-functioning, porous part of the entire electrode assembly devoid of electrical connections for activation and physical structural means for mounting and support in a cell or the like.

As indicated, the electrode body can be composed entirely of the integrated manganese powder composite. In many instances, however, a less frangible electrode body compact structure can be realized by fabricating it from a starting mixture of the particulate manganese base material with another metal component. Advantageously, such a mixture may be one of manganese and nickel (particularly carbonyl nickel) powders, although other metal powder components may be utilized such as copper, cobalt, iron, various of the stainless or corrosion-resisting steel alloys, the several nickel alloys and mixtures thereof or, additionally, with some nickel powder in the admixture so as to actually have a three- or more phase powdered metal mixture in the manufactured electrode. For that matter, it is even possible if desired and greater cost is not objectionable, to include some powdered precious metal, such as silver, palladium or platinum in a particulated manganese mixture to be compacted into the electrode body form.

In any event, the integrated, shaped substantially manganese porous electrode body should be made from a finely divided particulate, powder metal composition or alloy containing at least about 5 to 10 weight percent, based on metal content of the composition, of particulated metallic manganese. Preferably, the metallic manganese particulate is essentially elemental in character. Especially when manganese/nickel powdered metal mixtures are employed, it is desirable for the compactable composition to contain at least about 30 weight percent of the manganese constituent, with greater fragility in the structures (especially when minimal compacting pressures are utilized) often being experienced with increasing manganese content. Nonetheless, about a 1:1 weight ratio of manganese/nickel powders is frequently found to be a very good and versatile mixture to utilize for many purposes.

The particulate manganese from which are made the porous electrode bodies of the present invention should be as fine and uniformly sized as possible. Average particle sizes as small as 0.2 microns or those approaching such miniscule dimensions are desirable. Generally, the average particle size utilized is not in excess of 50 or so microns, being better if not larger than that on the 20–30 micron range. When other subdivided metals are mixed with the manganese powder, their involved particle sizes should be comparable to that indicated for manganese. Nickel, for example, is frequently easily available in powdered form of very small average particle size on the 2–5 micron scale.

The particular shape or discrete particle configuration of the manganese or other metal powders employed is of no special criticality, as is in most cases their source or method of preparation. It is merely necessary for the metal powder(s) to have appropriate characteristics so as to be fabricatable and compactable according to established powdered metal technology. Sometimes, however, when they are available in such physical form it may be beneficial for the individual powders to have pronouncedly crenulated or saw-tooth outlines since with such a style they may tend to interlock better and more securely upon compaction under pressure (thus allowing avoidance of sintering treatments to achieve satisfactory cohesiveness of and structural integrity in bodies fabricated therefrom).

The purity of the manganese powder employed should be as high as possible. Its content of oxide inclusions, dirt and other dross impurities should be at the lowest level procurable at least on a practical basis for commercial purposes, so that its constituency is as close to the elemental metal as is reasonably possible to obtain. Usually, commercial grades of "pure" manganese powder are suitable; although it may oftentimes be advantageous and worthwhile to utilize reagent grade materials for making the porous electrodes pursuant to the invention. Analogous standards are applicable to other metal powders employed when the electrode bodies are fabricated from mixtures of particulated manganese and other component metals, such as nickel. A satisfactory grade of carbonyl nickel powder for mixture with particulated manganese in practice of the invention is that commercially available and known as "Mond Type 287".

As indicated, the electrode bodies are oftentimes advantageously prepared by compaction of the involved metal powder(s) in so-called "green" form according to established powdered metal procedures. This may additionally include, as desired or necessary for any given fabrication, cold pressing and/or hot pressing with or without subsequent heat treatment and/or sintering (although the latter step(s) are frequently beneficial and may even be found necessary to employ).

However, it is possible to prepare a satisfactory shaped mass body (especially if maximum porosity is desirable therein) by mere sintering or exposure to heat at a suitable elevated temperature level of a confined but more or less loose mass of green metal powder(s) so as to bond the mass together solely under and by virtue of thermal influences and cohering causations without added dependence on physical, pressured compaction for consolidation and densification. In this connection, an excellent fundamental comprehension of shaped mass fabrication of metal powder bodies according to powder metallurgy techniques is available at pgs 155–171 and 216–231 of "Introduction To Powder Metallurgy" by Joel S. Hirschhorn (published by the American Powder Metallurgy Institute, 201 East 42nd Street, New York, N.Y. 10017, 1969 Ed.), and in like reference sources.

Another way that is sometimes suitable for making the cohesively bonded porous bodies is to utilize adhesive bonding agents to assist in obtaining of the desired coherent shaped mass of metal powder(s) being fabricated. Such bonding agents may be utilized with or without the application of a compacting, densification-increasing pressure; the use and/or extent of this likewise depending on the degree of porosity wanted from the starting green powder(s) in the electrode body being made. The bonding agent employed should be used in conventional quantities for the purpose; care being taken to not employ so much as might interfere with either satisfactory final open pore availability in and/or necessary electroconductivity of the resultant electrode body. Typical of bonding agents adaptable to such mode of electrode body fabrication are: various "Teflon" latexes and other fluorinated hydrocarbon polymers; epoxy cements; acrylate compositions and so forth.

Of course, the particular shape and configuration of the electrode body being made, as well as its intended porosity arrangement, must be given proper consideration in selection of the particular modes of fabrication to follow, as is all readily comprehended by those skilled in the art. The morphology and particle size distribution plus the actual composition of the metal powder(s) being fabricated must be taken into account. When other than loose sintering practices are followed to obtain maximum porosity products, more or less normal compacting pressures for the preparation of less than fully consolidated masses may usually be employed for the purpose. These, in typical but not limiting illustration of this, may be on the order of 40–60 thousand psi or so. Likewise, normal heat treating and/or sintering temperatures can also be utilized for the given powdered metal mass being fabricated under such conditions, such as those on the order of 700°–1200° C. or so.

A particularly attractive way to achieve and better control desired porosity characteristics and extents in the electrode bodies being fabricated is to include and utilize in the powdered metal mass being compacted a (generally minor) proportion of an inert, fugitive filler and pore-forming assistant that is removable after the pressing upon application of heat causing thermal decomposition of the transient filler material or pore former (or even by other extraction means, such as leaching when ordinary salt is employed for the porosity assisting function). This leaves purposive voids or pores in the resultant structure. Fugitive fillers decomposable by heat at an elevated temperature are ordinarily desirable since, if not specially decomposed for riddance in a separate heating step for the purpose, removal thereof may alternatively be neatly accomplished coincident with any heat treatment and/or sintering operation done with the compacted body. Normally in this connection, as is well known and widely practiced, any heating or sintering at elevated temperatures of the formed body is preferably performed in an inert, non-oxidizing (or, in some cases, non-nitriding or non-carbiding) atmosphere, such as according to existant needs and conditions, helium, argon and so forth. In certain instances as may be dictated by the particular compacted powdered metal mass being subjected to heat treatment, it may even be advantageous to do that in a reducing atmosphere, as in hydrogen.

One of the advantages in using as a pore former a fugitive filler component is to allow application of greater compacting pressure on the powdered metal mass in its fabrication without risk of excessive consolidation of the resultant electrode form. This avoids rendering of the desired porous body into too much of a densely solid structure.

In this connection, it is oftentimes found that more uniform porosity effects are achieved by utilizing green metal powder(s) of a uniformly small particle size that are fabricated without compaction by loose sintering techniques, or when physically pressure densified, by minimizing the degree of compaction that is performed on the mass being formed.

Ammonium carbonate, $(NH_4)_2CO_3$, is a particularly good material to employ as a fugitive filler for the powdered metal masses being formed into electrode bodies. It is suitably and compatibly pulverulant, and also readily disappears under sufficient heat into harmless products of decomposition at a relatively low temperature of about 58° C.; being further not reactive with the metals appropriate for use in following of the invention. Many like and equivalent substances may also be utilized as pore forming additives, as will be recognized by those skilled in the art. Usually, depending on what particular effect is trying to be accomplished and the particular properties involved of the substance employed for the purpose, the quantity of fugitive filler to incorporate in the metal powder mass to be compacted may be as high on a volume basis as the maximum percentage or porosity intended to be achieved in the final body structure. Of course, lesser proportions are also possible to employ. Oftentimes when ammonium carbonate is utilized, a charge thereof of between about 5 and 15 weight percent, frequently 10 or so percent, based on weight of metallic powder in the mass, is suitable for the admixture.

It is sometimes desirable to provide a foraminous screen or mesh reinforcement or backing internally or on one side of the electrode body. This may be done if the body, per se, tends to be somewhat weak and/or brittle in nature. While many materials can be used for this, expanded nickel or the like is generally quite suitable for such purpose.

Manganese electrode bodies in accordance with the present invention are advantageously prepared to have a porosity value (reckoned as a percentage of void space in a given volume of porous body or the difference remaining from 100 percent upon subtraction of the percentage of theoretical density measurable in the given solid-geometric body volume) that is between about 30 and about 90 percent. Advantageously for many utilizations, this value is found to be from about 60 to about 85 percent. The porosity, of course, provides for the desired minutely apertured interstitial passageways formed within and traversing the electrode body. As has been indicated, porosity is capable of being controlled by apt use of the pressure applied for compaction of the powdered metal mass and/or utilization of fugitive filler material in the unconsolidated mixture.

As is apparent from introspection, excessive porosity in compacted body structures from given powdered manganese starting compositions may result in a too fragile and delicate an obtained structure. On the other hand, too much consolidating densification may result in a body structure having overdiminished pore characteristics with interstitial passageways too small and fluid-inaccessible for most effective electrode usage (resulting in an electrode having undesirably low interior surface area per unit volume of body thereof). The larger pore sizes suitable for electrode purposes, say those having an average diameter or equivalent passageway opening measure on the order of 10–15 microns, are obtained by fabricating the electrode with minimized compaction using only a "loosely" pressed metal powder mass for the purpose. In other words, only enough pressure is in such cases applied to the mass to give an adequate conglomerating effect in order to provide an integral, unitary and cohesive, powdered metal product.

In this connection, the appropriate average pore size to effect and have in the porous manganese electrode bodies of the present invention depends, as will be appreciated by those skilled in the art, upon the particular use application to be made thereof. Usually, porous electrode bodies having nominal pore size diameters in the range of from about 0.1 to about 12 or so microns are adaptable to a wide variety of electrode utilizations. Often, it is more advantageous to have this range in the numerical size limitation that is between about 1 and 11 microns, with it sometimes being preferable to have it fall in an approximate 3-8 micron nominal diameter (or equivalent measure) span.

It is also usually beneficial for the degree of porosity built into the electrode body to be so correlated such that the total hole or open area on any given section of exposed surface or face portion of the structure provides an adequate proportion of the total area of that exposed surface so as to ensure satisfactory mass transfer capabilities and effects for fluid ingress and egress with respect to the electrode body.

Literally any desired configuration and/or body shape can be given to the porous manganese electrodes of the present invention. Wall section size or planar geometric face area can be as desired; and thickness can be suitable for given intended usages. It is frequently the practice to make the electrode body in a generally thin and flat rectangular or circular plaque form; although various composite structures (such as dual porosity arrangements) and other built-up forms may also be provided. Body thicknesses in such constructions may ordinarily be varied in the overall between about 5 and 500 or more mils (ca. 1.25 millimeters and 1.3 or so centimeters). More often it is in the range, frequently occurring as a matter of choice or design, between about 10 and about 250 mils (ca. between about 2.5 millimeters and 0.6 centimeters). In many cases, an appropriate body thickness for many electrochemical applications is found to be between about 15 and about 100 mils (ca. 3.75 and 125 millimeters).

Along this line, excellent dual porosity electrode bodies may be readily prepared in the practice of the present invention. This, by way of illustration, may be done by first preparing a coarse pore layer (such as one of a manganese/nickel powder mixture) with loose sintering or minimized compaction fabrication followed by fabrication thereon and thereover of the fine pore layer (such as one of a small particle size nickel powder) which is made and sintered in situ upon the coarse pore base with greater compacting effort for densification of the added fine pore layer.

EXEMPLIFICATION AND ILLUSTRATION OF THE INVENTION

To demonstrate the advantageous practice of the present invention, a number of experiments were performed with various porous manganese electrode bodies tested for performance along with, in some instances, electrodes containing other outstandingly good catalytically active metals, all as is set forth in the following; the same being taken in conjunction with the several views of the accompanying Drawing which are all graphical representations wherein FIGS. 1 and 2 respectively depict results from the Second and Fourth Examples hereof.

FIRST EXAMPLE

A physical mixture was made containing: 0.500±0.005 g of carbonyl nickel powder (Mond type 287): 0.500±0.005 g of manganese powder (Fisher Certified Reagent, screened to less than 37 microns); and 0.100±0.005 g of ammonium carbonate powder (Mallinkrodt Analytical Reagent, ball milled and screened to less than 37 microns). This was done by charging the components to a mortar, wherein they were thoroughly blended. This mixture was placed in a ½ inch diameter, single action pellet press and compacted under 10,000 pounds pressure (ca. 51,000 psi). The disc formed was: weighed (1.092 g); heated to 110° C. in a drying oven for 30 minutes; cooled; and then reweighed (0.993 g). The disc was subsequently placed in a furnace under argon atmosphere, heated to 950° C. and left at that temperature for 30 minutes. After slow cooling to room temperature under argon, the disc was reweighed (0.990 g).

The disc was then placed in a ⅜ inch (ca. 0.951 centimeter) stainless steel type-tube mounting fitting with an epoxy cement adhesive so that the area available for contact with the solution was a circle ⅜ inch in diameter (providing a face of 0.11 square inch or ca. 0.71 square centimeter). This tube fitting was attached to gas delivery tubes and connected as the cathode in an electrolytic cell. The electrolyte was an aqueous solution containing 100 g/liter NaOH at 60° C.; the anode was a thin platinum screen; and the voltage of the cathode was measured versus a standard Ag/AgCl reference electrode as was commercially obtained from BECKMAN INSTRUMENTS under the trademark "Lazaran". Voltage of the cathode versus Ag/AgCl was individually recorded from 0 milliamperes (ma) to 100 ma (0.0 amp/sq. in. or ca. 6.45 square centimeter to 0.91 amp/sq. in.) with separate supplies to the electrode of oxygen, air and nitrogen each in turn supplied at about 10.0 psig. The drop in cell voltage when supplied with oxygen or air compared to the values when supplied with nitrogen is taken as a measure of the effectiveness of the catalytic activity of the electrode when subjected to such testing. The results of the testing showed an excellent and very encouraging lowering of the voltage of the electrochemical cell employed by 0.817 volts when supplied with oxygen as compared to when supplied with nitrogen.

SECOND EXAMPLE

The procedure of the First Example was largely repeated to make similar porous electrode bodies from: in Run "A", a powdered metal mixture of 10 (weight) percent of finely divided platinum with the same nickel powder; in Run "B", 100 percent of the manganese powder; in Run "C", 50 percent each of the same manganese and nickel powders as employed in the First Example; and in Run "D", a powdered metal mixture of 10 weight percent of finely divided silver with the same nickel powder. Each of the porous electrode discs were pressed for compaction as in the First Example but, in each case, no sintering of the pressed bodies was done. Each disc was then tested for electrochemical performance in the same way as was done in the First Example. The results obtained with oxygen performance were as graphically portrayed in the accompanying FIG. 1 of the Drawing. These clearly illustrate the very good results obtainable in practice of the invention.

Similar good results are obtainable with an electrode test disc if made in the same way as that employed for the discs in the foregoing Runs "A" through "D" but from a 1:9 weight ratio mixture of the powdered manganese and nickel metal powders, such a resulting 10 percent manganese electrode capable of performing almost as well as that of the 10 percent silver product employed in Run "D".

THIRD EXAMPLE

The general procedure of the First Example was repeated to make a porous electrode disc having a diameter of about 2½ inches (ca. 6.35 centimeters) and a thickness between about 63 and 65 mils (ca. 0.160 and 0.165 centimeters), excepting that the starting metal powder composition was: 42 (weight) percent nickel powder having an average particle size between 2.6 and 3.3 microns; 42 percent of the same manganese powder as employed in the First Example; and 16 percent $(NH_4)_2CO_3$ powder. The pressed disc was sintered in argon at 800° C.

The resulting porous electrode disc was then electrochemically tested in an experimental chlor-alkali cell arrangement similar to that utilized in the following Fourth Example, but run with about 3 to 4½ psig gas pressure on the electrode, to determine upon performance the measure over increasing time periods of the voltage savings realized in the comparisons between operation with both nitrogen and oxygen gases applied to the electrode. The difference(s)—by subtraction—between voltage values obtained from nitrogen (i.e., inert gas) operation at any given point in time and those from oxygen (i.e., active gas) operation at the same point in time provide(s) reliable measure of voltage savings obtainable with and corresponding depolarization effect experienced upon use of the electrode as a cathode. The results obtained included achievement of a 0.9 volt depolarization effect at the outset of the cell operation and, in the course of a 5-day run period, a voltage saving of 0.6–0.9 volt during the entire operation. The fine performance realized is evident from this performance.

FOURTH EXAMPLE

A porous electrode prepared in an analogous manner and using the same starting composition as utilized in the First Example was made, excepting to press the body onto a reinforcing backing support of Exmet Type "10Ni12 3/0" expanded nickel metal (being a diamond shaped foraminous sheet having about a 10 mil or 0.0254 centimeter thickness with strand side dimensions of about 12 mils or 0.031 centimeter with its open diamond dimensions being about 125 mils or 0.317 centimeter for the larger point-to-point distance and 60 mils or 1.99 centimeter for the smaller). The fabricated electrode mass weighed 9.9140 g. Its measurements were: length—7.60 centimeters; width—3.05 centimeters; and thickness—0.154 centimeter. Its total volume was 3.570 cc, and it exhibited a theoretical density of 34.5 percent, its porosity accordingly having been 65.5 (volume) percent.

The electrode was mounted for evaluation as a cathode (with the backing screen on the electrolyte side to help resist gas pressure) in a standard test cell using an expanded titanium mesh anode coated with an oxide of ruthenium and titanium. Anode-to-cathode spacing was 9/32 inch or ca. 0.714 centimeter with an intermediate "Nafion" (DUPONT TM) ion exchange membrane separator in the cell. The aqueous anolyte contained 300 g/l NaCl and the catholyte was an aqueous solution containing 100 g/l NaOH; with the cell operated with a current density of 0.5 amp/in$^2$ at a temperature of about 70° C. and gas pressure on the back side of the cathode maintained between 4 and 5 psig.

Figure 2:
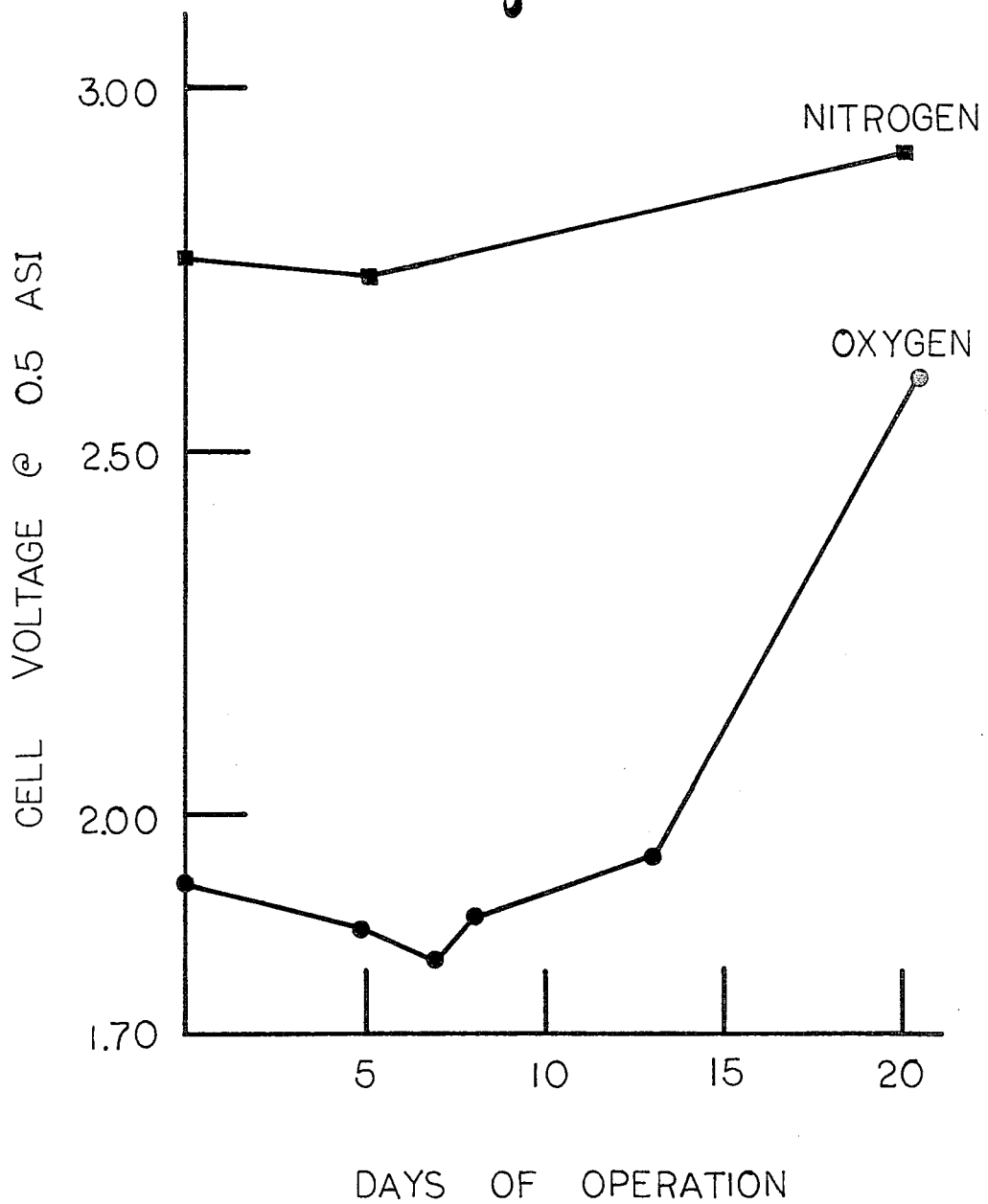

The excellent results obtained are graphically depicted in the self-explanatory graph of FIG. 2 of the Drawing.

Analogous and commensurate excellent and surprisingly good results are obtainable with the same similar porous manganese electrodes when employed in other electroreduction systems and for other electrochemical purposes (including synthesis reactions and so forth) or when utilized in the galvanic mode, as in fuel cells with an aqueous sodium hydroxide catholyte therein.

Many changes and modifications can readily be made and adapted in embodiments in accordance with the present invention without substantially departing from its apparent and intended spirit and scope, all in pursuance and accordance with same as it is set forth and defined in the hereto appended claims.

What is claimed is:

1. A metallic electrode body comprising an aggregate of metallic particles at least 5 weight % of which are manganese; said particles being substantially in their elemental form and having an average diameter of no more than about 50 microns; said particles being positioned in relation to each other to form interstitial passageways, said passageways having diameters from about 0.1 microns to about 12 microns; said passageways occupying from about 30% to about 90% of the volume of the body.

2. The electrode of claim 1 wherein the metallic particles consist essentially of manganese.

3. The electrode of claim 1 wherein the metallic particles are an admixture of nickel particles and manganese particles.

4. The electrode of claim 3 wherein the admixture of Ni particles and Mn particles contains at least about 5 weight percent Mn particles.

5. The electrode of claim 3 wherein the admixture of Ni particles and Mn particles contains at least about 30 weight percent Mn particles.

6. The electrode of claim 3 wherein the admixture of Ni particles and manganese particles contains at least about 50 weight percent Mn particles.

7. The electrode of claim 1 wherein the interstitial passageways occupy from about 65% to about 85% of the volume of the body.

* * * * *